(12) United States Patent
Agarwal et al.

(10) Patent No.: US 12,177,793 B2
(45) Date of Patent: Dec. 24, 2024

(54) METHODS AND APPARATUS FOR DETERMINING MAXIMUM POWER REDUCTION FOR UPLINK TRANSMISSION

(71) Applicant: QUALCOMM Incorporated, San Diego, CA (US)

(72) Inventors: Nitin Agarwal, San Diego, CA (US); Kausik Ray Chaudhuri, San Diego, CA (US); Girish Khandelwal, San Diego, CA (US); Joe Thomas, San Diego, CA (US); Marc Azar, La Jolla, CA (US); Sanghoon Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/644,508

(22) Filed: Dec. 15, 2021

(65) Prior Publication Data
US 2023/0189166 A1     Jun. 15, 2023

(51) Int. Cl.
*H04W 52/36*     (2009.01)
*H04W 52/14*     (2009.01)
*H04W 72/0453*   (2023.01)
*H04W 72/21*     (2023.01)

(52) U.S. Cl.
CPC ....... *H04W 52/367* (2013.01); *H04W 52/146* (2013.01); *H04W 72/0453* (2013.01); *H04W 72/21* (2023.01)

(58) Field of Classification Search
CPC ............. H04W 52/367; H04W 52/146; H04W 52/143; H04W 72/0453; H04W 72/21
See application file for complete search history.

(56) References Cited

U.S. PATENT DOCUMENTS

| 2013/0044621 | A1* | 2/2013 | Jung ...................... H04J 11/005 370/336 |
| 2015/0181517 | A1* | 6/2015 | Lee .................... H04W 52/0206 370/311 |
| 2015/0271824 | A1* | 9/2015 | Zhang ................. H04W 52/367 370/329 |
| 2017/0230960 | A1* | 8/2017 | Frank .................... H04W 72/21 |
| 2019/0229967 | A1  | 7/2019 | Frank |

OTHER PUBLICATIONS

International Search Report and Written Opinion—PCT/US2022/080974—ISA/EPO—Apr. 20, 2023.

* cited by examiner

*Primary Examiner* — Farid Seyedvosoghi
(74) *Attorney, Agent, or Firm* — Arent Fox Schiff LLP

(57) ABSTRACT

Aspects of the present disclosure include methods, apparatuses, and computer readable media for receiving an aggregate bandwidth configuration including, a downlink (DL) bandwidth configuration indicating DL resources for one or more DL receptions, and an uplink (UL) bandwidth configuration indicating UL resources for one or more UL transmissions, calculating a maximum power reduction backoff value based on the UL bandwidth configuration, and transmitting UL information for at least one of the one or more UL transmissions based on the maximum power reduction backoff value.

23 Claims, 5 Drawing Sheets

METHODS AND APPARATUS FOR DETERMINING MAXIMUM POWER REDUCTION FOR UPLINK TRANSMISSION

BACKGROUND

Aspects of the present disclosure relate generally to wireless communications, and more particularly, to apparatuses and methods for determining maximum power reduction for uplink transmission.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) may communicate with a user equipment (UE) via uplink (UL) and downlink (DL) channels. For a UE that supports multiple bandwidth parts (BWPs), the UE may regulate the transmission/reception power levels to reduce power usage. Conventional power regulation techniques may be insufficient to properly regulate the power levels. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving an aggregate bandwidth configuration including, a downlink (DL) bandwidth configuration indicating DL resources for one or more DL receptions, and an uplink (UL) bandwidth configuration indicating UL resources for one or more UL transmissions, calculating a maximum power reduction backoff value based on the UL bandwidth configuration, and transmitting UL information for at least one of the one or more UL transmissions based on the maximum power reduction backoff value.

Other aspects of the present disclosure include a user equipment (UE) having a memory comprising instructions, a transceiver, and one or more processors operatively coupled with the memory and the transceiver, the one or more processors configured to execute instructions in the memory to receive an aggregate bandwidth configuration including, a downlink (DL) bandwidth configuration indicating DL resources for one or more DL receptions, and an uplink (UL) bandwidth configuration indicating UL resources for one or more UL transmissions, calculate a maximum power reduction backoff value based on the UL bandwidth configuration, and transmit UL information for at least one of the one or more UL transmissions based on the maximum power reduction backoff value.

An aspect of the present disclosure includes a user equipment (UE) including means for receiving an aggregate bandwidth configuration including, a downlink (DL) bandwidth configuration indicating DL resources for one or more DL receptions, and an uplink (UL) bandwidth configuration indicating UL resources for one or more UL transmissions, means for calculating a maximum power reduction backoff value based on the UL bandwidth configuration, and means for transmitting UL information for at least one of the one or more UL transmissions based on the maximum power reduction backoff value.

Some aspects of the present disclosure include non-transitory computer readable media having instructions stored therein that, when executed by one or more processors of a user equipment (UE), cause the one or more processors to receive an aggregate bandwidth configuration including, a downlink (DL) bandwidth configuration indicating DL resources for one or more DL receptions, and an uplink (UL) bandwidth configuration indicating UL resources for one or more UL transmissions, calculate a maximum power reduction backoff value based on the UL bandwidth configuration, and transmit UL information for at least one of the one or more UL transmissions based on the maximum power reduction backoff value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
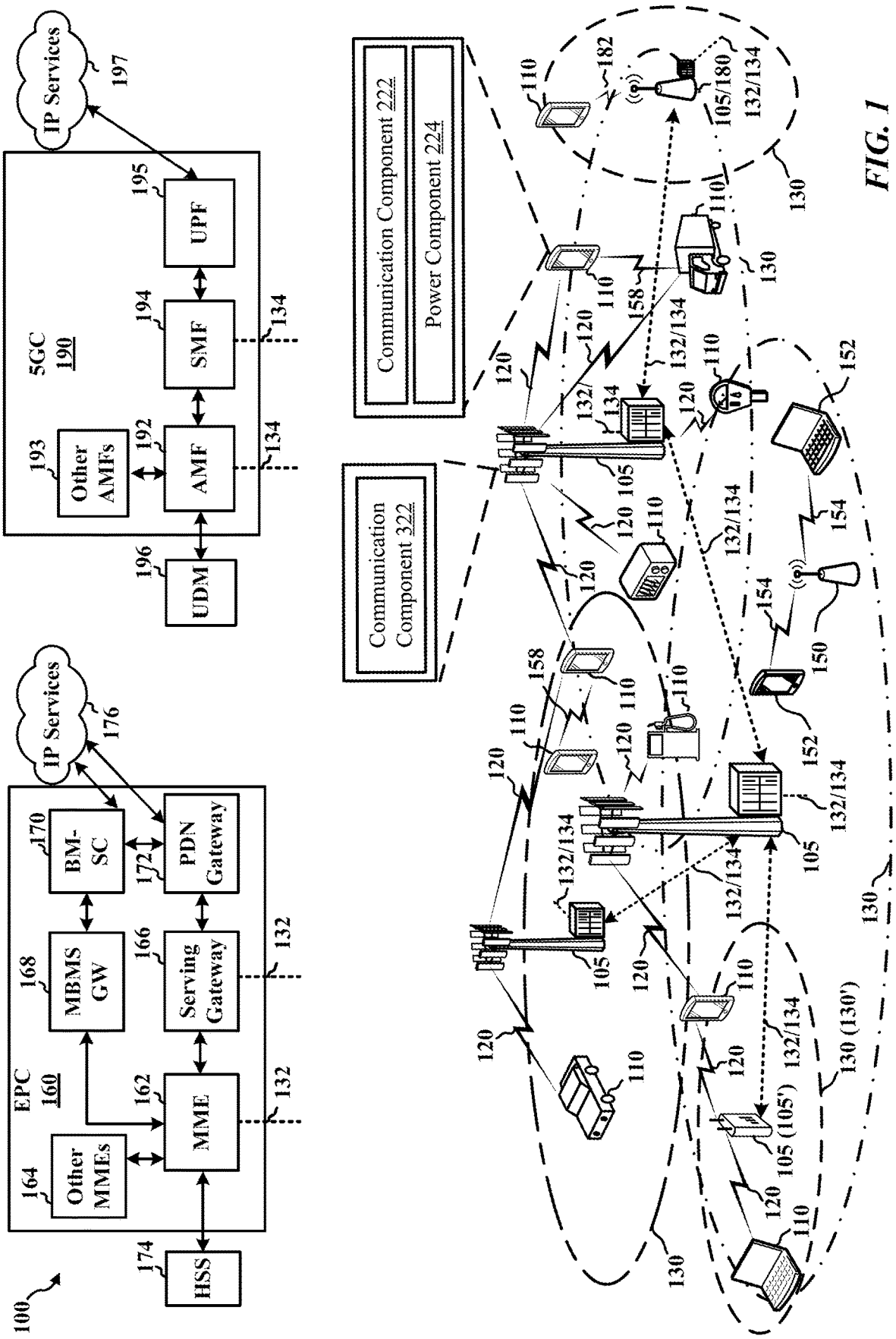
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some instances, a user equipment (UE) may allocate x component carriers (CCs) for downlink (DL) reception (RX) and y CCs for uplink (UL) transmission (TX), where x and y are integers. When the number of CCs for DL RX is increased from x to x' (e.g., 4 to 8) and the number of CCs for UL TX remains the same (e.g., 1), the gain for UL TX may change (e.g., decrease) even though the number of CCs for UL TX is unchanged. Specifically, even if the UL TX duty cycles are similar in both cases above (e.g., due to network continuous scheduling on UL and no assignments in DL), the maximum power reduction (MPR) may be higher in the second case. The MPR "backoff" in the second case above is high due to the MPR margins applied, and the UE reduces UL power. Due to the reduction, the UL TX performance may be degraded (e.g., 10%, 25%, 50%, or more) even though in UL only one CC is configured for UL TX (just the like first case). As a result, the data rate for the UL TX in the second case may be lower than the data rate for the UL TX in the first case, even though the number of CCs and the duty cycles are identical.

For example, for UL TX by the UE, for eight DL CC configuration based on the cyclic prefix orthogonal frequency division multiplexing (CP-OFDM) scheme, the MPR may be 2.5 decibel (dB) higher compared to the four DL CC configuration. For UL TX by the UE, for eight DL CC configuration based on the discreet Fourier transform orthogonal frequency division multiplexing (DFT-OFDM) scheme, the MPR may be 2.7 decibel (dB) higher compared to the four DL CC configuration. The UE may statically evaluate the configured bandwidth (BW) for DL without evaluating the UL CC configuration. The UE may apply a flat backoff value that changes with the cumulative BW. In an example, if the total bandwidth (excluding the guard band) is less than 400 megahertz (MHz), the UE may utilize the backoff value associated with the configuration for four CCs. If the total bandwidth is between 400 MHz and 800 Mhz, the UE may utilize the backoff value associated with the configuration for eight CCs.

In some instances, the configured UE maximum output power $P_{CMAX,f,c}$ for carrier f of a serving cell c may be defined as that available to the reference point of a given transmitter branch that corresponds to the reference point of the higher-layer filtered reference signal received power (RSRP) measurement.

In some aspects, the UE may report one or more of the $P_{CMAX,f,c}$ for the calculation of the power headroom (PH) field. The UE may report the PH to the BS. The PH reporting procedure may be used to provide the BS one or more of a type 1 power headroom indicating the difference between the nominal UE maximum transmit power and the estimated power for uplink shared channel (UL-SCH) transmission per activated serving cell, or a type 2 power headroom indicating the difference between the nominal UE maximum transmit power and the estimated power for UL-SCH and physical uplink control channel (PUCCH) transmission on a cell (e.g., SpCell) of the another medium access control (MAC) entity.

In an aspect of the present disclosure, the UE may calculate the MPR backoff based on one or more of a UL bandwidth configuration, an instantaneous bandwidth, a placement of the component carriers in the spectrum (CC in the beginning, middle, or end of the spectrum), rather than applying a flat backoff. In some cases, the UE may receive a maximum MPR backoff value for the cumulative aggregated BW from the network, and then the UE may compute the appropriate MPR, e.g., to enhance $P_{CMAX}$ and allowed power in the UL, based on UL CC allocation. The UE may configure the local oscillator based on the actual TX BW and/or MPR.

Aspects of the present disclosure may be implemented at the UE, such as via a processor configured to execute the functions described herein.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells.

In one implementation, the UE 110 may include a communication component 222 configured to communicate with the BS 105 via a cellular network, a Wi-Fi network, or other wireless and wired networks. The communication component 222 may be configured to receive the aggregate bandwidth configuration and/or transmit UL information. The UE 110 may include a power component 224 configured to compute the MPR backoff value based on the UL bandwidth configuration. In some implementations, the communication component 222 and/or the power component 224 may be implemented using hardware, software, or a combination of hardware and software. In some implementations, the BS 105 may include a communication component 322 configured to communicate with the UE 110. In some aspects, the communication component 322 may be configured to transmit the aggregate BW configuration to the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
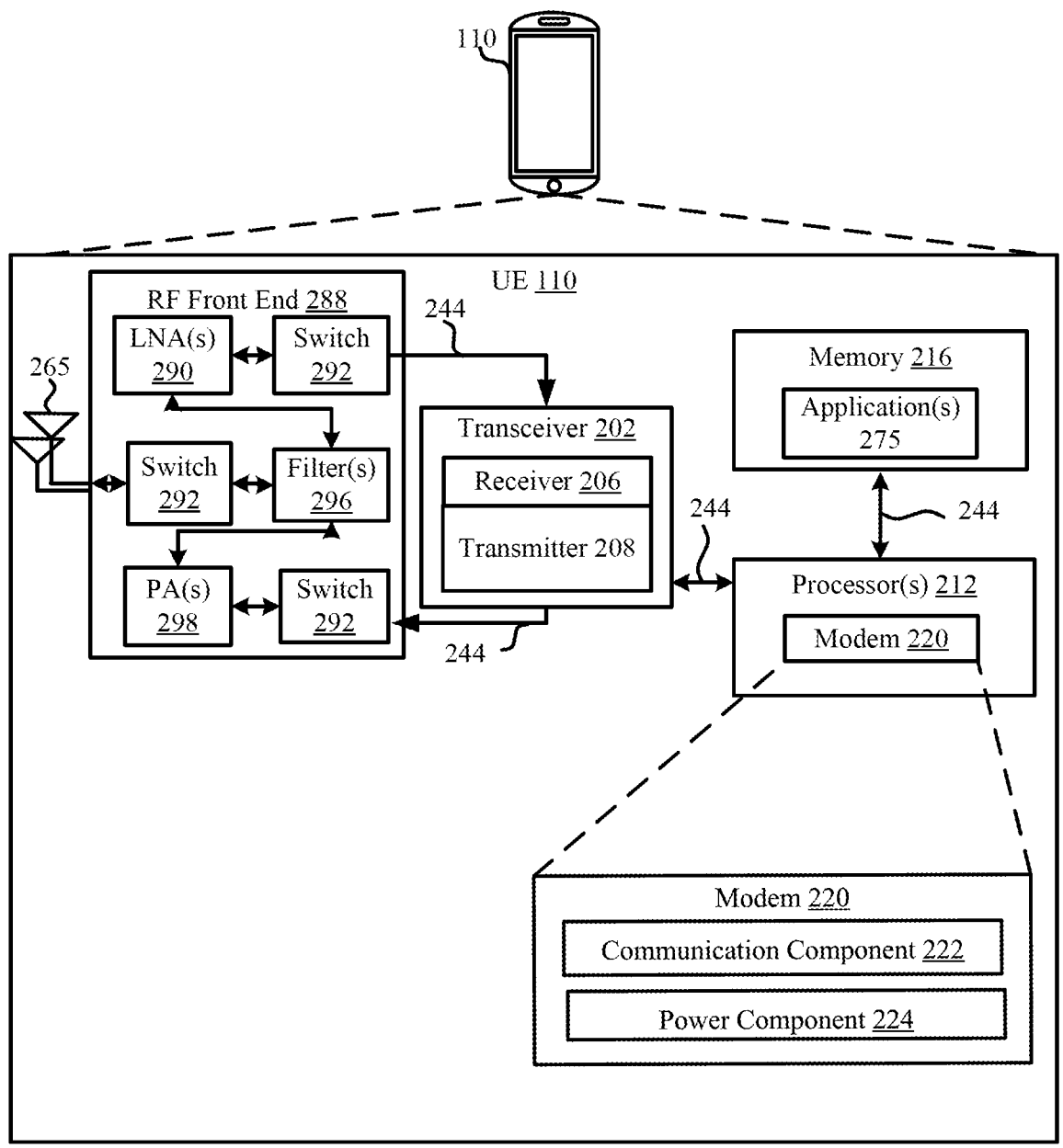
FIG. 2 is a schematic diagram of an example of a user equipment according to aspects of the present disclosure.

Referring to FIG. 2, one example of an implementation of the UE 110 may include a modem 220 having the communication component 222 and/or the power component 224 configured to perform the functions described herein. In one implementation, the UE 110 may include a communication component 222 configured to communicate with the BS 105 via a cellular network, a Wi-Fi network, or other wireless and wired networks. The communication component 222 may be configured to receive the aggregate bandwidth configuration and/or transmit UL information. The UE 110 may include a power component 224 configured to compute the MPR backoff value based on the UL bandwidth configuration.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the power component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222 and/or the power component 224, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or the power component 224, and/or one or more of the subcomponents, and/or data associated therewith, when UE 110 is operating at least one processor 212 to execute the communication component 222 and/or the power component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
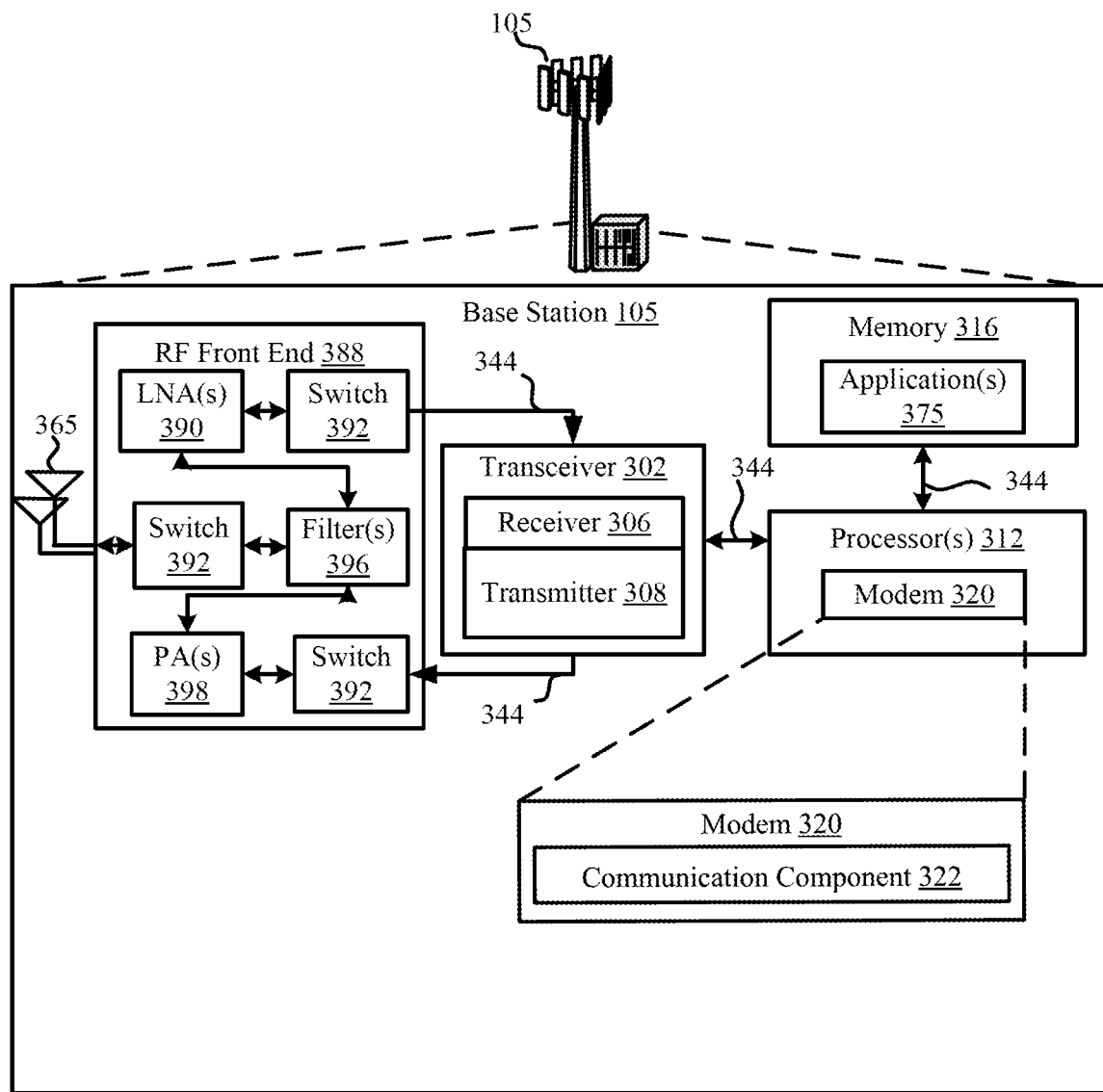
FIG. 3 is a schematic diagram of an example of a base station according to aspects of the present disclosure.

Referring to FIG. 3, one example of an implementation of the BS 105 may include a modem 320 having the communication component 322 configured to perform the functions described herein. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
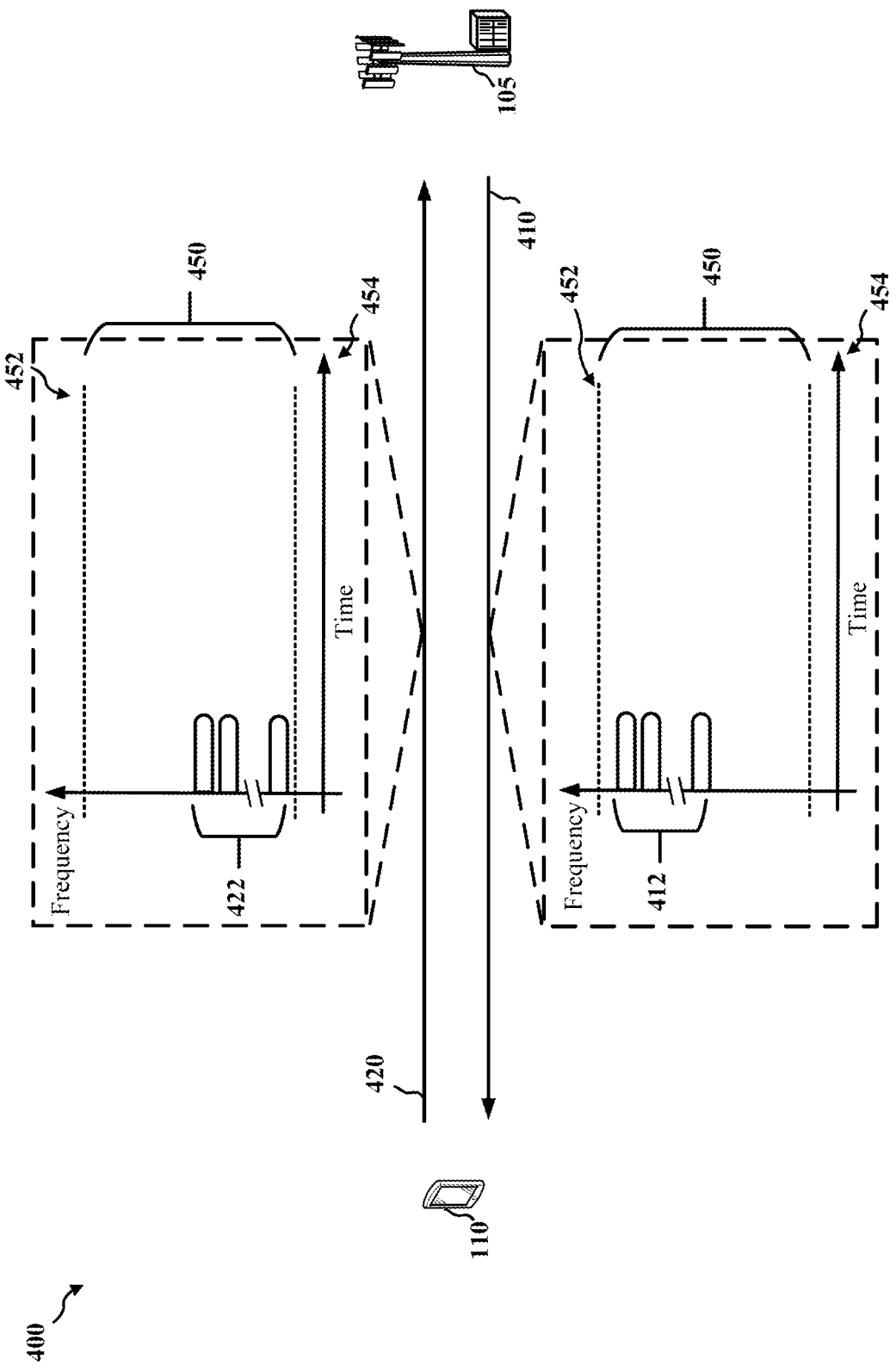
FIG. 4 illustrates an example of an environment for calculating maximum power reduction backoff values according to aspects of the present disclosure.

FIG. 4 illustrates an example of an environment for calculating maximum power reduction backoff values. In some aspects of the present disclosure, an environment 400 may include the BS 105 and the UE 110. The BS 105 may allocate DL resources for one or more DL receptions 410. The one or more DL receptions 410 may including DL data and/or control information. For the one or more DL receptions 410, the BS 105 may allocate one or more DL BWPs 412 within an aggregate bandwidth 450. The one or more DL BWPs 412 may be allocated near a first band edge 452 of the aggregate bandwidth 450 (within 1 kilohertz, 10 kilohertz, 100 kilohertz, 1 megahertz, or more of the first band edge 452), near a second band edge 454 of the aggregate bandwidth 450 (within 1 kilohertz, 10 kilohertz, 100 kilohertz, 1 megahertz, or more of the second band edge 454), or in the middle of the aggregate bandwidth 450 (more than 1 kilohertz, 10 kilohertz, 100 kilohertz, 1 megahertz, or more away from the first band edge 452 or the second band edge 454).

In some aspects of the present disclosure, the BS 105 may allocate UL resources for one or more UL transmissions 420. The one or more UL transmissions 420 may including UL data and/or control information. For the one or more UL transmissions 420, the BS 105 may allocate one or more UL BWPs 422 within the aggregate bandwidth 450. The one or more UL BWPs 422 may be allocated near the first band edge 452 of the aggregate bandwidth 450 (within 1 kilohertz, 10 kilohertz, 100 kilohertz, 1 megahertz, or more of the first band edge 452), near the second band edge 454 of the aggregate bandwidth 450 (within 1 kilohertz, 10 kilohertz, 100 kilohertz, 1 megahertz, or more of the second band edge 454), or in the middle of the aggregate bandwidth 450 (more than 1 kilohertz, 10 kilohertz, 100 kilohertz, 1 megahertz, or more away from the first band edge 452 or the second band edge 454).

In certain aspects of the present disclosure, the UE 110 may determine an UL power level for the one or more UL transmissions 420. The UE 110 may determine the UL power level for the one or more UL transmissions 420 based on a number of BWP of the one or more UL BWPs 422. The UE 110 may determine the UL power level without considering a number of BWP of the one or more DL BWPs 412. Examples of the UL power level may include the MPR backoff value. Specifically, the MPR backoff value may define an allowed reduction of the maximum transmission power level for certain BWP configurations. The MPR backoff value may depend on the combination of modulations, and/or the number of resource blocks assigned to the UE 110.

In certain aspects of the present disclosure, the aggregate bandwidth 450 may include aggregated channel resources available to the UE 110. The BS 105 may allocate the aggregate bandwidth 450 to the UE 110.

In some aspects, the UE 110 may calculate MPR backoff value based on one or more of the UL bandwidth configuration (e.g., the one or more UL BWPs 422), the DL bandwidth configuration (e.g., the one or more DL BWPs 412), an instantaneous bandwidth (e.g., a number of BWPs allocated for a particular transmission and/or a reception), and/or a position of the UL resources within the aggregated channel resources available to the UE 110 (as explained in detail below).

In a non-limiting example, the BS 105 may allocate four BWPs of the one or more DL BWPs 412 associated with a first DL reception of the one or more DL receptions 410 and eight BWPs of the one or more DL BWPs 412 associated with a second DL reception of the one or more DL receptions 410. The BS 105 may allocate one BWP of the one or more UL BWPs 422 associated with a first UL transmission of the one or more UL transmissions 420 and one BWP of the one or more UL BWPs 422 associated with a second UL transmission of the one or more UL transmissions 420. The power component 224 may determine and/or calculate the UL power level (e.g., the MPR backoff value) based on the number of BWPs allocated for the one or more UL transmissions 420 and not the one or more DL receptions 410. As a result, even though the number of DL BWPs increases from four to eight between the first DL reception and the second DL reception, the UL power level (e.g., the MPR backoff value) may remain unchanged between the first UL transmission and the second UL transmission because the number of UL BWPs remain constant (i.e., one UL BWP).

In one aspect of the present disclosure, the UE 110 may compute the UL power level (e.g., the MPR backoff value) based on the position of the UL BWPs 422 within the aggregate bandwidth 450. In one instance, if the UL BWPs 422 or a portion of the UL BWPs 422 are located near the first band edge 452 and/or the second band edge 454, the UE 110 may increase the MPR backoff value to reduce the transmission power. Such reduction in the transmission power may decrease an amount of interference caused to neighboring bands (not shown). In some instances, if the UL BWPs 422 are located away from the first band edge 452 and the second band edge 454, the UE 110 may reduce the MPR backoff value to increase the transmission power because the UL BWPs 422 may be "confined" within the aggregate bandwidth 450 by other resources, such as the DL BWPs 412. As such, even if some power from the UL transmission 420 "leaks" into neighboring bands, the other resources allocated to the UE 110 may provide buffers for such leakage.

In some aspects of the present disclosure, the UE 110 may tune local oscillators within one or more of the transceiver 202, the receiver 206, the transmitter, and/or the RF front end 288 based on the calculated MPR backoff value.

Figure 5:
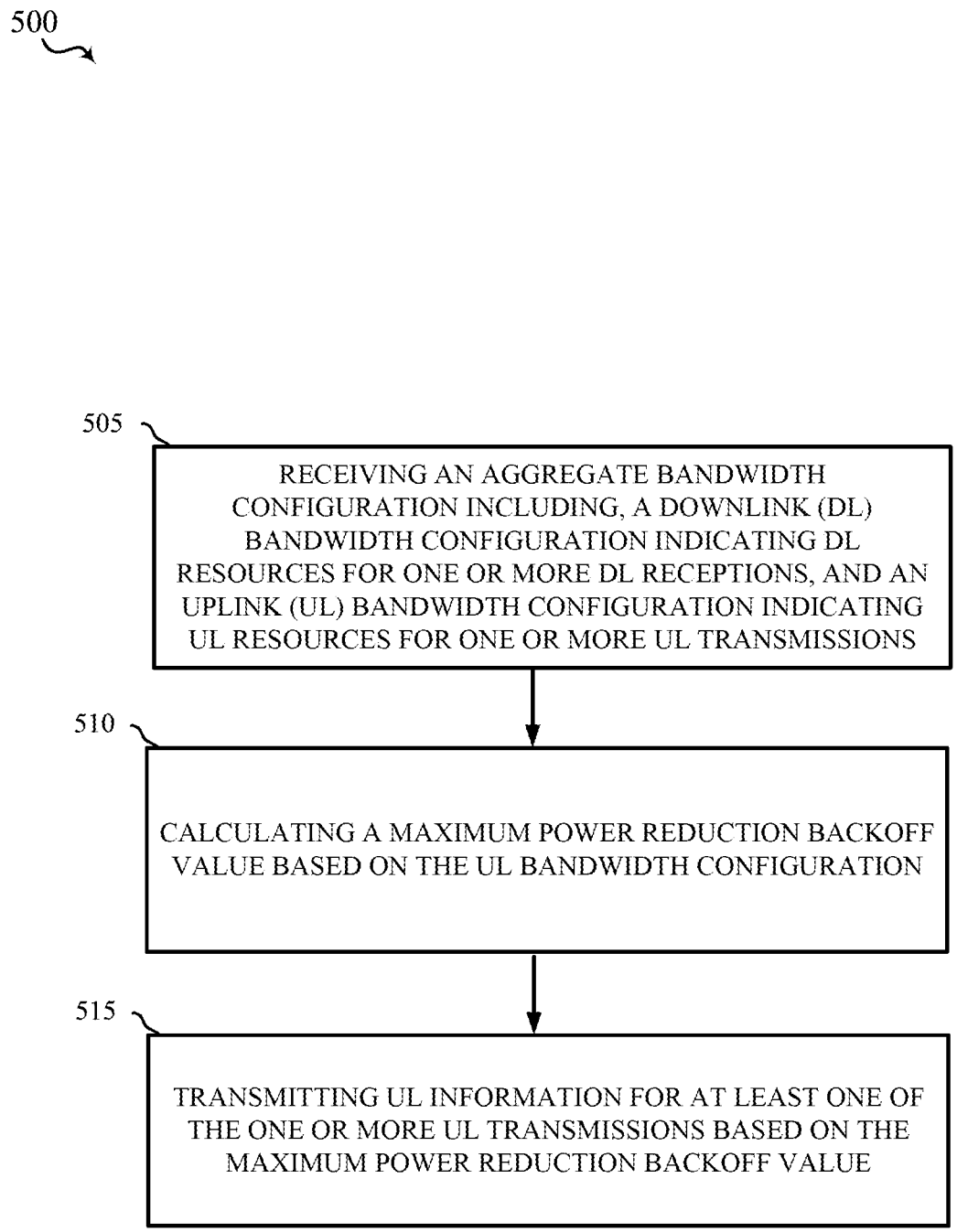
FIG. 5 illustrates an example of a method for calculating the maximum power reduction backoff value according to aspects of the present disclosure.

FIG. 5 illustrates an example of a method for calculating the maximum power reduction backoff value. For example, a method 500 may be performed by the one or more of the processor 212, the memory 216, the applications 275, the modem 220, the transceiver 202, the receiver 206, the transmitter 208, the RF front end 288, the communication component 222 and/or the power component 224, and/or one or more other components of the UE 110 in the wireless communication network 100.

At block 505, the method 500 may receive an aggregate bandwidth configuration including a downlink (DL) bandwidth configuration indicating DL resources for one or more DL receptions and an uplink (UL) bandwidth configuration indicating UL resources for one or more UL transmissions. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive an aggregate bandwidth configuration including a downlink (DL) bandwidth configuration indicating DL resources for one or more DL receptions and an uplink (UL) bandwidth configuration indicating UL resources for one or more UL transmissions as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving an aggregate bandwidth configuration including a downlink (DL) bandwidth configuration indicating DL resources for one or more DL receptions and an uplink (UL) bandwidth configuration indicating UL resources for one or more UL transmissions.

At block 510, the method 500 may calculate a maximum power reduction backoff value based on the UL bandwidth configuration. For example, the power component 224, the processor 212, the memory 216, the modem 220, and/or the applications 275 of the UE 110 may calculate a maximum power reduction backoff value based on the UL bandwidth configuration as described above.

In certain implementations, the power component 224, the processor 212, the memory 216, the modem 220, and/or the applications 275 may be configured to and/or may define means for calculating a maximum power reduction backoff value based on the UL bandwidth configuration.

At block 515, the method 500 may transmit UL information for at least one of the one or more UL transmissions based on the maximum power reduction backoff value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit UL information for at least one of the one or more UL transmissions based on the maximum power reduction backoff value as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting UL information for at least one of the one or more UL transmissions based on the maximum power reduction backoff value.

Alternatively or additionally, the method 500 may further include the method above, wherein the aggregate bandwidth configuration indicates aggregated channel resources, and calculating the maximum power reduction backoff value comprises calculating the maximum power reduction backoff value based on at least one of the DL bandwidth configuration, an instantaneous bandwidth, or a position of the UL resources within the aggregated channel resources.

Alternatively or additionally, the method 500 may further include any of the methods above, wherein the DL bandwidth configuration indicates a first DL resource of the DL resources for a first DL reception of the one or more DL receptions and a second DL resource of the DL resources for a second DL reception of the one or more DL receptions, the UL bandwidth configuration indicates a first UL resource of the UL resources for a first UL transmission of the one or more UL transmissions and a second UL resource of the UL resources for a second UL transmission of the one or more UL transmissions, calculating the maximum power reduction backoff value comprises identifying an increase from a first DL bandwidth allocated for the first DL reception to a second DL bandwidth allocated for the second DL reception, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Alternatively or additionally, the method 500 may further include any of the methods above, wherein calculating the maximum power reduction backoff value further comprises identifying the UL resources at a band edge of the aggregated channel resources, and identifying the maximum power reduction backoff value based on the UL resources being at the band edge.

Alternatively or additionally, the method 500 may further include any of the methods above, wherein identifying the maximum power reduction backoff value comprises identifying an initial power reduction backoff value based on the UL bandwidth configuration, selecting an adjusted power reduction backoff value based on the UL resources being at the band edge, and wherein transmitting the UL information comprises transmitting the UL information based on the adjusted power reduction backoff value.

Alternatively or additionally, the method 500 may further include any of the methods above, wherein the aggregate bandwidth configuration indicates: a first aggregated channel bandwidth associated with a first UL transmission of the one or more UL transmissions and a first DL reception of the one or more DL receptions, and a second aggregated channel bandwidth associated with a second UL transmission of the one or more UL transmissions and a second DL reception of the one or more DL receptions, and calculating the maximum power reduction backoff value comprises identifying an increase from the first aggregated channel bandwidth to the second aggregated channel bandwidth, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Alternatively or additionally, the method 500 may further include any of the methods above, further comprising tuning a transmission local oscillator based on the maximum power reduction backoff value.

Additional Implementations

Aspects of the present disclosure include methods by a user equipment (UE) for receiving an aggregate bandwidth configuration including, a downlink (DL) bandwidth configuration indicating DL resources for one or more DL receptions, and an uplink (UL) bandwidth configuration indicating UL resources for one or more UL transmissions, calculating a maximum power reduction backoff value based on the UL bandwidth configuration, and transmitting UL information for at least one of the one or more UL transmissions based on the maximum power reduction backoff value.

Any of the methods above, wherein the aggregate bandwidth configuration indicates aggregated channel resources, and calculating the maximum power reduction backoff value comprises calculating the maximum power reduction backoff value based on at least one of the DL bandwidth configuration, an instantaneous bandwidth, or a position of the UL resources within the aggregated channel resources.

Any of the methods above, wherein the DL bandwidth configuration indicates a first DL resource of the DL resources for a first DL reception of the one or more DL receptions and a second DL resource of the DL resources for a second DL reception of the one or more DL receptions, the UL bandwidth configuration indicates a first UL resource of the UL resources for a first UL transmission of the one or more UL transmissions and a second UL resource of the UL resources for a second UL transmission of the one or more UL transmissions, calculating the maximum power reduction backoff value comprises identifying an increase from a first DL bandwidth allocated for the first DL reception to a second DL bandwidth allocated for the second DL reception, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the methods above, wherein calculating the maximum power reduction backoff value further comprises identifying the UL resources at a band edge of the aggregated channel resources, and identifying the maximum power reduction backoff value based on the UL resources being at the band edge.

Any of the methods above, wherein identifying the maximum power reduction backoff value comprises identifying an initial power reduction backoff value based on the UL bandwidth configuration, selecting an adjusted power reduction backoff value based on the UL resources being at the band edge, and wherein transmitting the UL information comprises transmitting the UL information based on the adjusted power reduction backoff value.

Any of the methods above, wherein the aggregate bandwidth configuration indicates: a first aggregated channel bandwidth associated with a first UL transmission of the one or more UL transmissions and a first DL reception of the one or more DL receptions, and a second aggregated channel bandwidth associated with a second UL transmission of the one or more UL transmissions and a second DL reception of the one or more DL receptions, and calculating the maximum power reduction backoff value comprises identifying an increase from the first aggregated channel bandwidth to the second aggregated channel bandwidth, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the methods above, further comprising tuning a transmission local oscillator based on the maximum power reduction backoff value.

Other aspects of the present disclosure include a user equipment (UE) having a memory comprising instructions, a transceiver, and one or more processors operatively coupled with the memory and the transceiver, the one or more processors configured to execute instructions in the memory to receive an aggregate bandwidth configuration including, a downlink (DL) bandwidth configuration indicating DL resources for one or more DL receptions, and an uplink (UL) bandwidth configuration indicating UL resources for one or more UL transmissions, calculate a maximum power reduction backoff value based on the UL bandwidth configuration, and transmit UL information for at least one of the one or more UL transmissions based on the maximum power reduction backoff value.

Any of the UEs above, wherein the aggregate bandwidth configuration indicates aggregated channel resources, and calculating the maximum power reduction backoff value comprises calculating the maximum power reduction backoff value based on at least one of the DL bandwidth configuration, an instantaneous bandwidth, or a position of the UL resources within the aggregated channel resources.

Any of the UEs above, wherein the DL bandwidth configuration indicates a first DL resource of the DL resources for a first DL reception of the one or more DL receptions and a second DL resource of the DL resources for a second DL reception of the one or more DL receptions, the UL bandwidth configuration indicates a first UL resource of the UL resources for a first UL transmission of the one or more UL transmissions and a second UL resource of the UL resources for a second UL transmission of the one or more UL transmissions, calculating the maximum power reduction backoff value comprises identifying an increase from a first DL bandwidth allocated for the first DL reception to a second DL bandwidth allocated for the second DL reception, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the UEs above, wherein calculating the maximum power reduction backoff value further comprises identifying the UL resources at a band edge of the aggregated channel resources, and identifying the maximum power reduction backoff value based on the UL resources being at the band edge.

Any of the UEs above, wherein identifying the maximum power reduction backoff value comprises identifying an initial power reduction backoff value based on the UL bandwidth configuration, selecting an adjusted power reduction backoff value based on the UL resources being at the band edge, and wherein transmitting the UL information comprises transmitting the UL information based on the adjusted power reduction backoff value.

Any of the UEs above, wherein the aggregate bandwidth configuration indicates: a first aggregated channel bandwidth associated with a first UL transmission of the one or more UL transmissions and a first DL reception of the one or more DL receptions, and a second aggregated channel bandwidth associated with a second UL transmission of the one or more UL transmissions and a second DL reception of the one or more DL receptions, and calculating the maximum power reduction backoff value comprises identifying an increase from the first aggregated channel bandwidth to the second aggregated channel bandwidth, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the UEs above, wherein the one or more processors are further configured to tune a transmission local oscillator based on the maximum power reduction backoff value.

An aspect of the present disclosure includes a user equipment (UE) including means for receiving an aggregate bandwidth configuration including, a downlink (DL) bandwidth configuration indicating DL resources for one or more DL receptions, and an uplink (UL) bandwidth configuration indicating UL resources for one or more UL transmissions, means for calculating a maximum power reduction backoff value based on the UL bandwidth configuration, and means for transmitting UL information for at least one of the one or more UL transmissions based on the maximum power reduction backoff value.

Any of the UEs above, wherein the aggregate bandwidth configuration indicates aggregated channel resources, and means for calculating the maximum power reduction backoff value comprises means for calculating the maximum power reduction backoff value based on at least one of the DL bandwidth configuration, an instantaneous bandwidth, or a position of the UL resources within the aggregated channel resources.

Any of the UEs above, wherein the DL bandwidth configuration indicates a first DL resource of the DL resources for a first DL reception of the one or more DL receptions and a second DL resource of the DL resources for a second DL reception of the one or more DL receptions, the UL bandwidth configuration indicates a first UL resource of the UL resources for a first UL transmission of the one or more UL transmissions and a second UL resource of the UL resources for a second UL transmission of the one or more UL transmissions, means for calculating the maximum power reduction backoff value comprises means for identifying an increase from a first DL bandwidth allocated for the first DL reception to a second DL bandwidth allocated for the second DL reception, means for identifying a first UL bandwidth allocated for the first UL transmission being identical to a second UL bandwidth allocated for the second UL transmission, and means for identifying the maximum power reduction backoff value for the second UL transmission, wherein the maximum power reduction backoff value is identical to a previous backoff value for the first UL transmission.

Any of the UEs above, wherein means for calculating the maximum power reduction backoff value further comprises means for identifying the UL resources at a band edge of the aggregated channel resources, and means for identifying the maximum power reduction backoff value based on the UL resources being at the band edge.

Any of the UEs above, wherein means for identifying the maximum power reduction backoff value comprises means for identifying an initial power reduction backoff value based on the UL bandwidth configuration, means for selecting an adjusted power reduction backoff value based on the UL resources being at the band edge, and wherein means for transmitting the UL information comprises means for transmitting the UL information based on the adjusted power reduction backoff value.

Any of the UEs above, wherein the aggregate bandwidth configuration indicates: a first aggregated channel bandwidth associated with a first UL transmission of the one or more UL transmissions and a first DL reception of the one or more DL receptions, and a second aggregated channel bandwidth associated with a second UL transmission of the one or more UL transmissions and a second DL reception of the one or more DL receptions, and means for calculating the maximum power reduction backoff value comprises means for identifying an increase from the first aggregated channel bandwidth to the second aggregated channel bandwidth, means for identifying a first UL bandwidth allocated for the first UL transmission being identical to a second UL bandwidth allocated for the second UL transmission, and means for identifying the maximum power reduction backoff value for the second UL transmission, wherein the maximum power reduction backoff value is identical to a previous backoff value for the first UL transmission.

Any of the UEs above, further comprising means for tuning a transmission local oscillator based on the maximum power reduction backoff value.

Some aspects of the present disclosure include non-transitory computer readable media having instructions stored therein that, when executed by one or more processors of a user equipment (UE), cause the one or more processors to receive an aggregate bandwidth configuration including, a downlink (DL) bandwidth configuration indicating DL resources for one or more DL receptions, and an uplink (UL) bandwidth configuration indicating UL resources for one or more UL transmissions, calculate a maximum power reduction backoff value based on the UL bandwidth configuration, and transmit UL information for at least one of the one or more UL transmissions based on the maximum power reduction backoff value.

Any of the non-transitory computer readable media above, wherein the aggregate bandwidth configuration indicates aggregated channel resources, and the instructions for calculating the maximum power reduction backoff value comprises instructions for calculating the maximum power reduction backoff value based on at least one of the DL bandwidth configuration, an instantaneous bandwidth, or a position of the UL resources within the aggregated channel resources.

Any of the non-transitory computer readable media above, wherein the DL bandwidth configuration indicates a first DL resource of the DL resources for a first DL reception of the one or more DL receptions and a second DL resource of the DL resources for a second DL reception of the one or more DL receptions, the UL bandwidth configuration indicates a first UL resource of the UL resources for a first UL transmission of the one or more UL transmissions and a second UL resource of the UL resources for a second UL transmission of the one or more UL transmissions, the instructions for calculating the maximum power reduction backoff value comprises instructions for identifying an increase from a first DL bandwidth allocated for the first DL reception to a second DL bandwidth allocated for the second DL reception, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the non-transitory computer readable media above, wherein the instructions for calculating the maximum power reduction backoff value further comprising instructions for identifying the UL resources at a band edge of the aggregated channel resources, and identifying the maximum power reduction backoff value based on the UL resources being at the band edge.

Any of the non-transitory computer readable media above, wherein the instructions for identifying the maximum power reduction backoff value further comprising instructions for identifying an initial power reduction backoff value based on the UL bandwidth configuration, selecting an adjusted power reduction backoff value based on the UL resources being at the band edge, and wherein instructions for transmitting the UL information comprises instructions for transmitting the UL information based on the adjusted power reduction backoff value.

Any of the non-transitory computer readable media above, wherein the aggregate bandwidth configuration indicates: a first aggregated channel bandwidth associated with a first UL transmission of the one or more UL transmissions and a first DL reception of the one or more DL receptions, and a second aggregated channel bandwidth associated with a second UL transmission of the one or more UL transmissions and a second DL reception of the one or more DL receptions, and calculating the maximum power reduction backoff value comprises identifying an increase from the first aggregated channel bandwidth to the second aggregated channel bandwidth, identifying a first UL bandwidth allocated for the first UL transmission being identical to a second UL bandwidth allocated for the second UL transmission, and identifying the maximum power reduction backoff value for the second UL transmission, wherein the maximum power reduction backoff value is identical to a previous backoff value for the first UL transmission.

Any of the non-transitory computer readable media above, further comprising instructions, when executed by the one or more processors, cause the one or more processors to tune a transmission local oscillator based on the maximum power reduction backoff value.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 NEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
receiving an aggregate bandwidth configuration including:
a downlink (DL) bandwidth configuration indicating DL resources for one or more DL receptions; and
an uplink (UL) bandwidth configuration indicating UL resources for one or more UL transmissions;
calculating a maximum power reduction backoff value based on the UL bandwidth configuration; and
transmitting UL information for at least one of the one or more UL transmissions based on the maximum power reduction backoff value.

2. The method of claim 1, wherein:
the aggregate bandwidth configuration indicates aggregated channel resources; and
calculating the maximum power reduction backoff value comprises calculating the maximum power reduction backoff value based on at least one of the DL bandwidth configuration, an instantaneous bandwidth, or a position of the UL resources within the aggregated channel resources.

3. The method of claim 2, wherein:
the DL bandwidth configuration indicates a first DL resource of the DL resources for a first DL reception of the one or more DL receptions and a second DL resource of the DL resources for a second DL reception of the one or more DL receptions;
the UL bandwidth configuration indicates a first UL resource of the UL resources for a first UL transmission of the one or more UL transmissions and a second UL resource of the UL resources for a second UL transmission of the one or more UL transmissions;
calculating the maximum power reduction backoff value comprises;
identifying an increase from a first DL bandwidth allocated for the first DL reception to a second DL bandwidth allocated for the second DL reception;
identifying a first UL bandwidth allocated for the first UL transmission being identical to a second UL bandwidth allocated for the second UL transmission; and
identifying the maximum power reduction backoff value for the second UL transmission, wherein the maximum power reduction backoff value is identical to a previous backoff value for the first UL transmission.

4. The method of claim 2, wherein calculating the maximum power reduction backoff value further comprises:
identifying the UL resources at a band edge of the aggregated channel resources; and
identifying the maximum power reduction backoff value based on the UL resources being at the band edge.

5. The method of claim 4, wherein identifying the maximum power reduction backoff value comprises:
identifying an initial power reduction backoff value based on the UL bandwidth configuration;
selecting an adjusted power reduction backoff value based on the UL resources being at the band edge; and
wherein transmitting the UL information comprises transmitting the UL information based on the adjusted power reduction backoff value.

6. The method of claim 1, wherein:
the aggregate bandwidth configuration indicates:
a first aggregated channel bandwidth associated with a first UL transmission of the one or more UL transmissions and a first DL reception of the one or more DL receptions; and
a second aggregated channel bandwidth associated with a second UL transmission of the one or more UL transmissions and a second DL reception of the one or more DL receptions; and
calculating the maximum power reduction backoff value comprises:
identifying an increase from the first aggregated channel bandwidth to the second aggregated channel bandwidth;
identifying a first UL bandwidth allocated for the first UL transmission being identical to a second UL bandwidth allocated for the second UL transmission; and
identifying the maximum power reduction backoff value for the second UL transmission, wherein the maximum power reduction backoff value is identical to a previous backoff value for the first UL transmission.

7. The method of claim 1, further comprising:
tuning a transmission local oscillator based on the maximum power reduction backoff value.

8. A user equipment (UE), comprising:
a memory comprising instructions;
a transceiver; and
one or more processors operatively coupled with the memory and the transceiver, the one or more processors configured to execute instructions in the memory to:
receive an aggregate bandwidth configuration including:
a downlink (DL) bandwidth configuration indicating DL resources for one or more DL receptions; and
an uplink (UL) bandwidth configuration indicating UL resources for one or more UL transmissions;
calculate a maximum power reduction backoff value based on the UL bandwidth configuration; and
transmit UL information for at least one of the one or more UL transmissions based on the maximum power reduction backoff value.

9. The UE of claim 8, wherein:
the aggregate bandwidth configuration indicates aggregated channel resources; and
calculating the maximum power reduction backoff value comprises calculating the maximum power reduction backoff value based on at least one of the DL bandwidth configuration, an instantaneous bandwidth, or a position of the UL resources within the aggregated channel resources.

10. The UE of claim 9, wherein:
the DL bandwidth configuration indicates a first DL resource of the DL resources for a first DL reception of the one or more DL receptions and a second DL resource of the DL resources for a second DL reception of the one or more DL receptions;
the UL bandwidth configuration indicates a first UL resource of the UL resources for a first UL transmission of the one or more UL transmissions and a second UL resource of the UL resources for a second UL transmission of the one or more UL transmissions;
calculating the maximum power reduction backoff value comprises;
identifying an increase from a first DL bandwidth allocated for the first DL reception to a second DL bandwidth allocated for the second DL reception;

identifying a first UL bandwidth allocated for the first UL transmission being identical to a second UL bandwidth allocated for the second UL transmission; and identifying the maximum power reduction backoff value for the second UL transmission, wherein the maximum power reduction backoff value is identical to a previous backoff value for the first UL transmission.

11. The UE of claim 9, wherein calculating the maximum power reduction backoff value further comprises:
identifying the UL resources at a band edge of the aggregated channel resources; and
identifying the maximum power reduction backoff value based on the UL resources being at the band edge.

12. The UE of claim 11, wherein identifying the maximum power reduction backoff value comprises:
identifying an initial power reduction backoff value based on the UL bandwidth configuration;
selecting an adjusted power reduction backoff value based on the UL resources being at the band edge; and
wherein transmitting the UL information comprises transmitting the UL information based on the adjusted power reduction backoff value.

13. The UE of claim 8, wherein:
the aggregate bandwidth configuration indicates:
a first aggregated channel bandwidth associated with a first UL transmission of the one or more UL transmissions and a first DL reception of the one or more DL receptions; and
a second aggregated channel bandwidth associated with a second UL transmission of the one or more UL transmissions and a second DL reception of the one or more DL receptions; and
calculating the maximum power reduction backoff value comprises:
identifying an increase from the first aggregated channel bandwidth to the second aggregated channel bandwidth;
identifying a first UL bandwidth allocated for the first UL transmission being identical to a second UL bandwidth allocated for the second UL transmission; and
identifying the maximum power reduction backoff value for the second UL transmission, wherein the maximum power reduction backoff value is identical to a previous backoff value for the first UL transmission.

14. The UE of claim 8, wherein the one or more processors are further configured to:
tune a transmission local oscillator based on the maximum power reduction backoff value.

15. A user equipment (UE), comprising:
means for receiving an aggregate bandwidth configuration including;
a downlink (DL) bandwidth configuration indicating DL resources for one or more DL receptions; and
an uplink (UL) bandwidth configuration indicating UL resources for one or more UL transmissions;
means for calculating a maximum power reduction backoff value based on the UL bandwidth configuration; and
means for transmitting UL information for at least one of the one or more UL transmissions based on the maximum power reduction backoff value.

16. The UE of claim 15, wherein:
the aggregate bandwidth configuration indicates aggregated channel resources; and means for calculating the maximum power reduction backoff value comprises means for calculating the maximum power reduction backoff value based on at least one of the DL bandwidth configuration, an instantaneous bandwidth, or a position of the UL resources within the aggregated channel resources.

17. The UE of claim 16, wherein:
the DL bandwidth configuration indicates a first DL resource of the DL resources for a first DL reception of the one or more DL receptions and a second DL resource of the DL resources for a second DL reception of the one or more DL receptions;
the UL bandwidth configuration indicates a first UL resource of the UL resources for a first UL transmission of the one or more UL transmissions and a second UL resource of the UL resources for a second UL transmission of the one or more UL transmissions;
means for calculating the maximum power reduction backoff value comprises means for;
identifying an increase from a first DL bandwidth allocated for the first DL reception to a second DL bandwidth allocated for the second DL reception;
identifying a first UL bandwidth allocated for the first UL transmission being identical to a second UL bandwidth allocated for the second UL transmission; and
identifying the maximum power reduction backoff value for the second UL transmission, wherein the maximum power reduction backoff value is identical to a previous backoff value for the first UL transmission.

18. The UE of claim 16, wherein means for calculating the maximum power reduction backoff value further comprises:
means for identifying the UL resources at a band edge of the aggregated channel resources; and
means for identifying the maximum power reduction backoff value based on the UL resources being at the band edge.

19. The UE of claim 18, wherein means for identifying the maximum power reduction backoff value comprises:
means for identifying an initial power reduction backoff value based on the UL bandwidth configuration;
means for selecting an adjusted power reduction backoff value based on the UL resources being at the band edge; and
wherein means for transmitting the UL information comprises means for transmitting the UL information based on the adjusted power reduction backoff value.

20. The UE of claim 15, wherein:
the aggregate bandwidth configuration indicates:
a first aggregated channel bandwidth associated with a first UL transmission of the one or more UL transmissions and a first DL reception of the one or more DL receptions; and
a second aggregated channel bandwidth associated with a second UL transmission of the one or more UL transmissions and a second DL reception of the one or more DL receptions;
means for calculating the maximum power reduction backoff value comprises means for:
identifying an increase from the first aggregated channel bandwidth to the second aggregated channel bandwidth;
identifying a first UL bandwidth allocated for the first UL transmission being identical to a second UL bandwidth allocated for the second UL transmission; and identifying the maximum power reduction backoff value for the second UL transmission, wherein the maximum power reduction backoff value is identical to a previous backoff value for the first UL transmission.

21. The UE of claim 15, further comprising:
means for tuning a transmission local oscillator based on the maximum power reduction backoff value.

22. The method of claim 1, wherein calculating the maximum power reduction backoff value comprises calculating the maximum power reduction backoff value based on a position of one or more UL component carriers relative to a beginning or end of a spectrum.

23. The UE of claim 8, wherein the one or more processors are further configured to calculate the maximum power reduction backoff value based on a position of one or more UL component carriers relative to a beginning or end of a spectrum.

* * * * *